United States Patent
Sharma et al.

(10) Patent No.: US 10,255,080 B2
(45) Date of Patent: *Apr. 9, 2019

(54) METHOD OF PROVIDING NON-NATIVE NOTIFICATIONS AND SYSTEM THEREOF

(71) Applicant: BlueStack Systems, Inc., Campbell, CA (US)

(72) Inventors: Shashi Kant Sharma, Haryana (IN); Sharad Agrawal, Haryana (IN); Suman Saraf, Haryana (JP); David P. Reese, Jr., Sunnyvale, CA (US)

(73) Assignee: BlueStack Systems, Inc., Campbell, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 15/209,069

(22) Filed: Jul. 13, 2016

(65) Prior Publication Data

US 2016/0321121 A1 Nov. 3, 2016

Related U.S. Application Data

(63) Continuation of application No. 13/644,840, filed on Oct. 4, 2012, now Pat. No. 9,445,392, which is a (Continued)

(51) Int. Cl.
*G06F 17/30* (2006.01)
*G06F 9/455* (2018.01)
(Continued)

(52) U.S. Cl.
CPC .......... *G06F 9/445* (2013.01); *G06F 9/45558* (2013.01); *G06F 9/542* (2013.01); (Continued)

(58) Field of Classification Search
CPC .................. G06F 17/30017–17/30867; G06F 3/1423–3/1431; G06F 8/60–8/61; (Continued)

(56) References Cited

U.S. PATENT DOCUMENTS 7,647,491 B2 1/2010 Kawano et al.
7,987,432 B1 7/2011 Grechishkin et al.
(Continued)

OTHER PUBLICATIONS

Online article saved as PDF file "May 2011, Trivedi, Android Notifier1—Receive Alerts on Desktop".*
(Continued)

*Primary Examiner* — Wing F Chan
*Assistant Examiner* — Rajeshwari Krishnan
(74) *Attorney, Agent, or Firm* — The Webb Law Firm

(57) ABSTRACT

Embodiments of the present invention are directed to a method of providing non-native notifications and system thereof. These notifications are generated by non-native applications that can be executed on a target device, specifically within a guest environment on the target device, or can be executed on a physically disjoint source device that is communicatively coupled with the target device via a local pairing mechanism or a service in a cloud. The application player and the source device are able to capture these non-native notifications. The target device is able to receive and present these non-native notifications to a user. Notifications include alerts, reminders, updates and messages generated by non-native applications. The user does not need to access the non-native applications, or the application player or source device they are executing on to see the non-native notifications. Instead, the user views these non-native notifications at a central location on the target device.

16 Claims, 12 Drawing Sheets

Related U.S. Application Data continuation-in-part of application No. 13/543,052, filed on Jul. 6, 2012.

(60) Provisional application No. 61/545,079, filed on Oct. 7, 2011.

(51) Int. Cl.
| | |
|---|---|
| *G06F 9/54* | (2006.01) |
| *H04L 12/58* | (2006.01) |
| *H04L 29/08* | (2006.01) |
| *G06F 9/445* | (2018.01) |
| *H04L 29/06* | (2006.01) |
| *H04W 4/14* | (2009.01) |
| *G06F 9/451* | (2018.01) |
| *G06F 8/60* | (2018.01) |
| *G06F 3/01* | (2006.01) |

(52) U.S. Cl.
CPC ........ *G06F 9/546* (2013.01); *G06F 17/30174* (2013.01); *H04L 51/24* (2013.01); *H04L 67/10* (2013.01); *H04L 67/26* (2013.01); *H04L 67/42* (2013.01); *H04W 4/14* (2013.01); *G06F 3/01* (2013.01); *G06F 8/60* (2013.01); *G06F 9/451* (2018.02); *G06F 9/45533* (2013.01); *H04L 67/1095* (2013.01)

(58) Field of Classification Search
CPC . G06F 9/44505–9/45558; G06Q 10/00–10/10; G06Q 30/06–30/0613; H04L 67/10–67/1095
See application file for complete search history.

(56) References Cited

U.S. PATENT DOCUMENTS

| | | | |
|---|---|---|---|
| 8,117,554 B1 * | 2/2012 | Grechishkin | ....... G06F 9/45558 715/764 |
| 8,161,275 B1 | 4/2012 | Woodward | |
| 8,438,375 B1 | 5/2013 | Woodward | |
| 8,819,202 B1 | 8/2014 | Carolan et al. | |
| 8,924,958 B1 | 12/2014 | Bangur et al. | |
| 9,380,562 B1 * | 6/2016 | Vetter | ..................... H04L 63/08 |
| 2003/0140313 A1 | 7/2003 | Smith | |
| 2004/0019601 A1 | 1/2004 | Gates | |
| 2005/0004992 A1 | 1/2005 | Horstmann et al. | |
| 2005/0114870 A1 | 5/2005 | Song et al. | |
| 2005/0149922 A1 | 7/2005 | Vincent | |
| 2006/0259537 A1 * | 11/2006 | Emberton | .............. G06Q 10/10 709/200 |
| 2008/0083036 A1 | 4/2008 | Ozzie et al. | |
| 2008/0133903 A1 | 6/2008 | Sun et al. | |
| 2008/0215672 A1 | 9/2008 | Kloba et al. | |
| 2008/0216071 A1 | 9/2008 | Gidalov | |
| 2010/0199037 A1 | 8/2010 | Umbehocker et al. | |
| 2010/0218184 A1 | 8/2010 | Minematsu et al. | |
| 2011/0016299 A1 | 1/2011 | Galicia et al. | |
| 2011/0035355 A1 | 2/2011 | Sagar et al. | |
| 2011/0082900 A1 | 4/2011 | Nagpal et al. | |
| 2011/0106880 A1 | 5/2011 | Strong et al. | |
| 2011/0110315 A1 | 5/2011 | Chen et al. | |
| 2011/0126216 A1 | 5/2011 | Galicia et al. | |
| 2011/0276621 A1 | 11/2011 | Edery et al. | |
| 2011/0302630 A1 | 12/2011 | Nair et al. | |
| 2012/0011513 A1 | 1/2012 | McConaughy et al. | |
| 2012/0023507 A1 | 1/2012 | Travis | |
| 2012/0042159 A1 | 2/2012 | Liu | |
| 2012/0066675 A1 | 3/2012 | Shelansky et al. | |
| 2012/0079095 A1 | 3/2012 | Evans et al. | |
| 2012/0086716 A1 | 4/2012 | Reeves et al. | |
| 2012/0089906 A1 | 4/2012 | Reeves et al. | |
| 2012/0089992 A1 | 4/2012 | Reeves et al. | |
| 2012/0110315 A1 | 5/2012 | Lee | |
| 2012/0110496 A1 | 5/2012 | Lee et al. | |
| 2012/0124028 A1 * | 5/2012 | Tullis | ....................... G06F 8/60 707/711 |
| 2012/0143900 A1 | 6/2012 | Ainslie | |
| 2012/0191961 A1 | 7/2012 | Wu et al. | |
| 2012/0197968 A1 | 8/2012 | Korovin et al. | |
| 2012/0216181 A1 | 8/2012 | Arcese et al. | |
| 2012/0303476 A1 | 11/2012 | Krzyanowski et al. | |
| 2012/0324434 A1 | 12/2012 | Tewari et al. | |
| 2013/0024778 A1 | 1/2013 | Reeves et al. | |
| 2013/0047150 A1 | 2/2013 | Malasky et al. | |
| 2013/0054952 A1 | 2/2013 | Shen | |
| 2013/0074069 A1 | 3/2013 | Li | |
| 2013/0095785 A1 | 4/2013 | Sadana et al. | |
| 2013/0139182 A1 | 5/2013 | Sethuraman et al. | |
| 2013/0268397 A1 | 10/2013 | Mehta et al. | |
| 2014/0007222 A1 | 1/2014 | Qureshi et al. | |
| 2014/0095929 A1 | 4/2014 | Chan | |
| 2015/0230124 A1 | 8/2015 | Damola | |

OTHER PUBLICATIONS

Online article saved as PDF file "Feb. 2011, Demers, Android Notifier2—Use desktop as SMS workstation".*
Online article saved as PDF file "Jun. 2011, Lanier, iCloud Features".*
Online article saved as PDF file "May 2011, Sage, How to install Android apps".*
Online search results "appstores for android apps—Google Search".*
Online search results "_android notifier_—Google Search".*
Slangen, "Two Apps to Use Your Android Phone From Your Computer", MakeUseOf, Nov. 5, 2010, Retrieved from https://www.makeuseof.com/tag/apps-android-phone-computer/.
Wilson, "Steam Comes to Mac, Offers Cross-Platform Gaming Free of Charge", Gizmodo, Mar. 8, 2010, Retrieved from https://gizmodo.com/5488383/steam-comes-to-mac-offers-cross-platform-gaming-free-of-charge.
Perez, Sarah, "How to get android notifications on your computer desktop (Mac, Linux or Windows)", Sep. 7, 2010, 5 pages.
Online Article on Android Notifier, Apr. 2011, 20 pages.
Online publication "7 iCloud Features Typical iPhone & iPad Users Will Love", Jun. 2011, 8 pages.
Online publication "Apple Introduces iCloud", Jun. 2011, 2 pages.

* cited by examiner

US 10,255,080 B2

METHOD OF PROVIDING NON-NATIVE NOTIFICATIONS AND SYSTEM THEREOF

RELATED APPLICATIONS

This application is a continuation of the co-pending U.S. patent application Ser. No. 13/644,840, filed Oct. 4, 2012, entitled "A Method of Providing Non-native Notifications and System thereof." The co-pending U.S. patent application Ser. No. 13/644,840, filed Oct. 4, 2012, entitled "A Method of Providing Non-native Notifications and System thereof" claims benefit of priority under 35 U.S.C. section 119(e) of the U.S. Provisional Patent Application Ser. No. 61/545,079, filed Oct. 7, 2011, entitled "System and Method for Mapping Keys to Touch or Mouse Clicks," and is a continuation in part of the co-pending U.S. patent application Ser. No. 13/543,052, filed Jul. 6, 2012, entitled "Cloud-Based Data Synchronization," all of which are hereby incorporated by reference in their entirety.

FIELD OF THE INVENTION

The present invention relates to notifications. More particularly, the present invention relates to a method of providing non-native notifications and system thereof.

BACKGROUND OF THE INVENTION

A marketplace is an online digital distribution center that delivers content to devices over a network. A marketplace can be an established application store, such as Google Apps Marketplace or Apple's AppStores, or can be provided by a mobile carrier, such as AT&T or Verizon. Application developers typically publish developed applications in the marketplace to which for users subscribe. Users typically are not allowed to push any data to the marketplace.

FIG. 1 illustrates a system 100 for delivery of content. The system 100 includes a marketplace 105 and a plurality of devices 110a, 110b. The plurality of devices 110a, 110b are coupled to the marketplace 105 for user(s) of these devices 110a, 110b to retrieve applications published by application developers onto these devices 110a, 110b. If a user wishes to have an application, such as Angry Birds Space, running on each device 110a, 110b, the user may separately download Angry Birds Space from the marketplace 105 on the devices 110a, 100b. For example, in FIG. 1, the user's tablet 110a connects with and downloads Angry Birds Space from the marketplace 105. Similarly, the user's smart phone 110b connects with and downloads Angry Birds Space from the marketplace 105. This process involves repeatedly visiting the marketplace 105. In addition, if Angry Birds Space was removed, either intentionally or accidentally, from the tablet 110a, and the user wants to have Angry Birds Space running on the tablet 110a again, the user would need to yet again visit the marketplace 105 to download Angry Birds Space from the marketplace 105 onto the tablet 110a.

With the proliferation of devices, it is typical for any user to own more than one device, such as the tablet 110a and the smart phone 110b of FIG. 1. In fact, it is not uncommon for a user to have more than two devices at a time, such as a laptop computer and two smart phones, one for personal use and another for corporate use. The user can access corporate email from the laptop computer, have alarms programmed on the personal smart phone, and have meeting events set in the calendar on the corporate smart phone. Each device is able to provide the user with notifications generated by applications on the device. A notification, no matter how loud it rings or chimes or how strong it vibrates, is not useful if the user is not aware of the notification. It could simply be that the user did not hear the notification (e.g., the user was in a noisy subway), was not able to get to the device (e.g., the device was at the bottom of gym bag) and had thereafter forgotten about the notification, had simply left the device elsewhere, or for another reason. Missing any notification causes inconveniences.

The present invention addresses at least these limitations in the prior art.

SUMMARY OF THE INVENTION

Embodiments of the present invention are directed to a method of providing non-native notifications and system thereof. These notifications are generated by non-native applications that can be executed on a target device, specifically within a guest environment on the target device, or can be executed on a physically disjoint source device that is communicatively coupled with the target device via a local pairing mechanism or a service in a cloud. The application player and the source device are able to capture these non-native notifications. The target device is able to receive and present these non-native notifications to a user. Notifications include alerts, reminders, updates and messages generated by non-native applications. The user does not need to access the non-native applications, or the application player or source device they are executing on to see the non-native notifications. Instead, the user can view these non-native notifications at a central location on the target device.

In one aspect, a non-transitory computer-readable medium is provided. The non-transitory computer-readable medium stores instructions that, when executed by a computing device including a host operating system, cause the computing device to perform a method. The method includes obtaining from a notification tool for a notification generated by a non-native application, and informing a user of the notification. The notification can be an SMS message or an alert regarding an event.

In some embodiments, the computing device also includes a guest operating system, and the non-native application is a guest operating system specific application executing in the guest operating system.

Alternatively or in addition to, the computing device is communicatively coupled with an electronic device, and the non-native application is an application executing on the electronic device. In some embodiments, the computing device and the electronic device are coupled via a cloud. In some embodiments, the computing device and the electronic device are coupled via a local pairing mechanism.

In some embodiments, the method also includes allowing the user to access data associated with the notification. The data can be visually and/or auditorially provided to the user.

In some embodiments, informing a user of the notification includes displaying the notification at a central location on the computing device. In some embodiments, informing a user of the notification includes displaying the notification over a work area.

In some embodiments, the method also includes receiving user input, and pushing the user input to the notification tool.

In another aspect, a system is provided. The system includes a notification tool configured to capture a notification generated by a non-native application. The system also includes a target device which includes a message center. The message center is typically in communication with the notification tool and is configured to inform a user of the notification. In some embodiments, the message center is configured to obtain user input in response to the notification to be provided to the notification tool.

The non-native application can be a text messaging application, a news feed application, a networking application, an email application, a calendar application, a game application, a tool application, a marketing application, or an alarm application. Other applications are contemplated.

In some embodiments, the target device supports a host operating system and a guest operating system, and wherein the non-native application is a guest operating system specific application executing on the target device.

In some embodiments, the system also includes a source device which includes the notification tool, and the non-native application executes on the source device. The target device and the source device can be communicatively coupled via a local pairing mechanism. Alternatively, the system can include a cloud, and the target device can be communicatively coupled with the source device via the cloud; the source device and the target device are each configured to at least one of publish and subscribe to data from the cloud.

In some embodiments, the system can include a plurality of source devices communicatively coupled with the target device. Each source device includes one or more applications configured to provide notifications regarding event changes, and the target device is configured to receive such notifications from the source devices.

In yet another aspect, a method is provided. The method includes communicatively coupling a target device and a source device, the source device receiving a notification generated by an application running on the source device, and the target device displaying a pane in the foreground of a workspace on the target device, the pane including information regarding the notification. In some embodiments, the target device and the source device are communicatively coupled via a local pairing mechanism or a cloud.

In yet another aspect, a method is provided. The method includes an application player receiving a notification generated by an application running within the application player on a computing device, and the computing device displaying a pane in the foreground of a workspace on the target device, the pane including information regarding the notification. In some embodiments, the application player is associated with a guest environment.

BRIEF DESCRIPTION OF THE DRAWINGS

Reference will now be made in detail to implementations of the present invention as illustrated in the accompanying drawings. The same reference indicators will be used throughout the drawings and the following detailed description to refer to the same or like parts.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Cloud-Based Data Synchronization (CBDS) Overview

In some embodiments, two or more devices associated with an account in a cloud can be synched. The account is configured to manage publishing and subscription relationships between these devices such that a first device is able to publish data to the account in the cloud, and a second device is able to subscribe to the data from the account. In some embodiments, the account is configured to determine whether the second device has proper dependencies for subscribing to the data, and to prevent the second device from subscribing to the data upon determining that the second device does not have proper dependencies. However, in some embodiments, proper dependencies are automatically satisfied by downloading and installing a tool configured to properly process the data (e.g., execute applications) on the second device. In some embodiments, the tool is the BlueStacks™ application player.

The BlueStacks™ application player is disclosed in the co-pending application Ser. No. 13/479,086, entitled "Apparatuses, Systems and Methods of Switching Operating Systems," filed on May 23, 2012, and in the co-pending application Ser. No. 13/479,056, entitled "Application Player," filed on May 23, 2012, which are hereby incorporated by reference.

Figure 1:
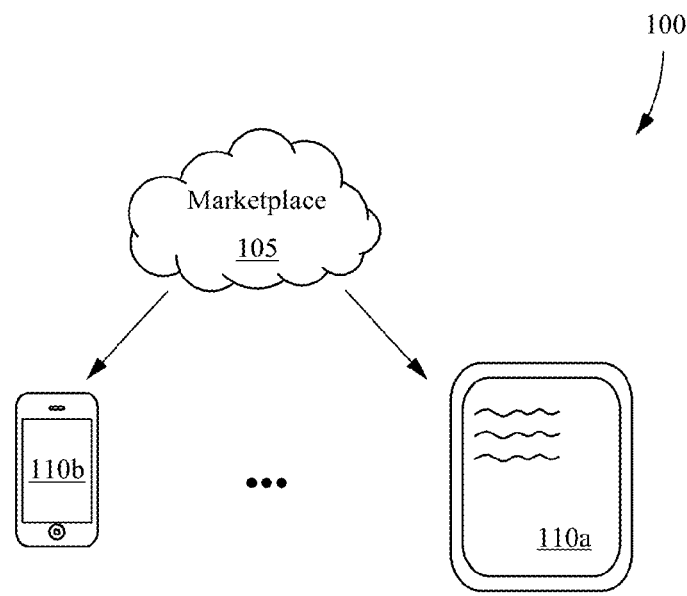
FIG. 1 illustrates a system for delivery of content according to the prior art.
Figure 2:
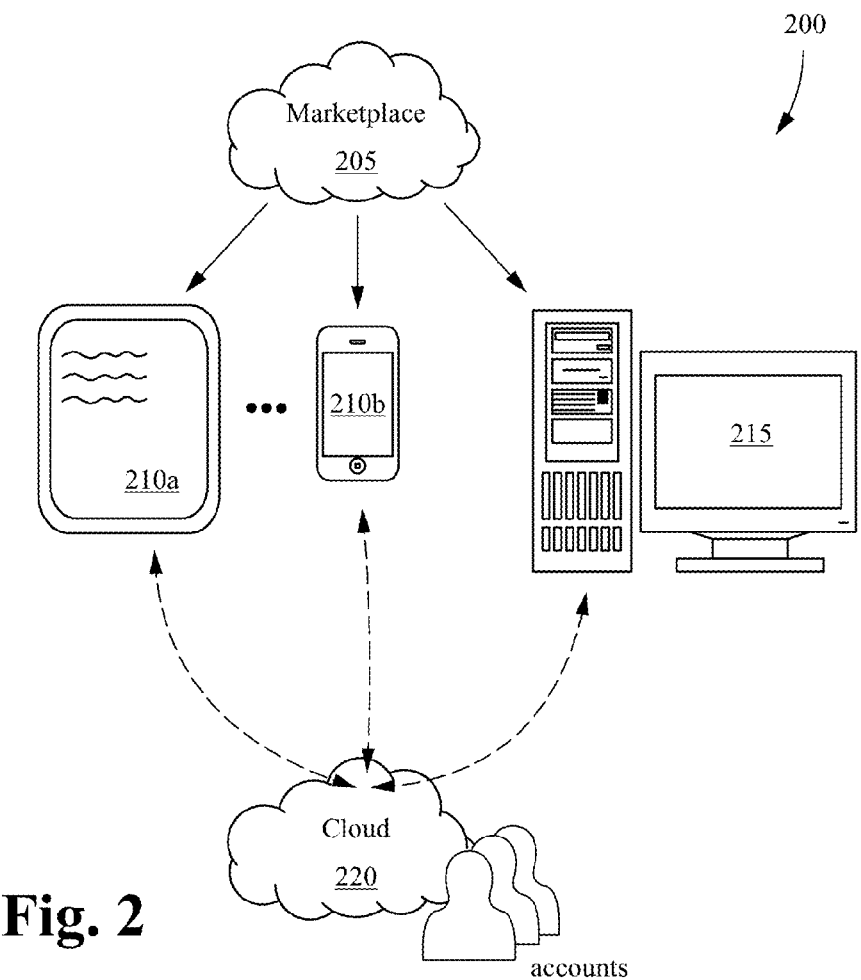
FIG. 2 illustrates an exemplary system for synching data across devices in accordance with the present invention.

FIG. 2 illustrates an exemplary system 200 for synching data across devices in accordance with the present invention. The system 200 includes a marketplace 205, a plurality of devices 210-215, and BlueStacks™ cloud service hosted in the cloud 220. The marketplace 205 is similarly configured as the marketplace 105. Each device 210-215 can be communicatively coupled with the marketplace 205 when retrieving applications published by application developers. Assume the devices 210-215 belong to or are otherwise accessible by a user, and the user wants to synch data across the devices 210-215. The user is able to utilize the cloud service to synch data across the devices 210-215 via the cloud 220. Although, each of the devices 210-215 shown is different, the user is able to synch data across similar devices, e.g., PC to PC sync or phone to phone sync. Typically, the user creates an account in the cloud 220 and associates the devices 210-215 with the account. Any of the associated devices is capable of being synched via the cloud. Each device 210-215 can support one or more operating systems, which may be the same or different from the other operating systems supported by the other devices 210-215. For example, the tablet 210a is an Apple iPad, the mobile phone 210b is an Android phone, and the computer 215 is a Windows 7 PC. For another example, the computer 215 supports a guest Android operating system. Although only three devices are shown in FIG. 2, other special purpose devices, such as set top boxes and automobile consoles to name a couple, can also be associated with the account for synchronization.

In some embodiments, each device must be associated with an account in the cloud that the device is sending data to and/or receiving data from. Put differently, a device is preferably only able to access an account that the device is associated with. Alternatively, a device is able to subscribe to data from any account if given the permission to do so. A device is a source device when it is publishing data to the cloud. A device is a target device when it is subscribing to data from the cloud. Data includes, but is not limited to, applications, phone book, calendar, notifications (e.g., alerts and SMS messages), email, memo, a music file, a photo/video album, documents, files and another other suitable data. In some embodiments, the account is configured to properly manage intellectual property rights of applications, including copyrights. Notifications are further discussed below.

Figure 3A:
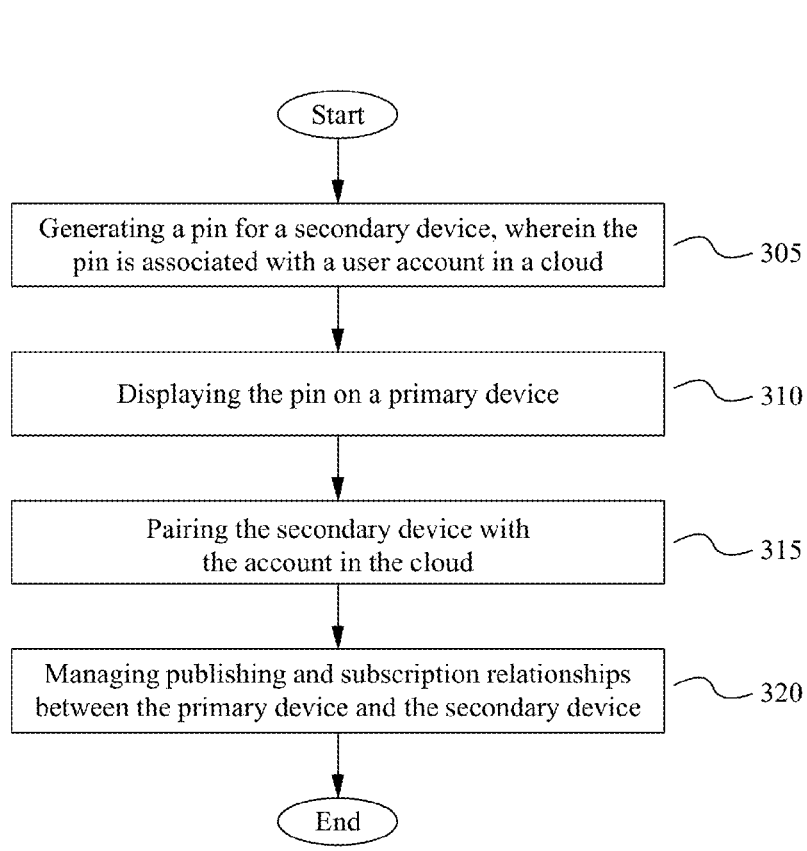
FIG. 3A illustrates an exemplary method of enabling publishing and subscription of data in accordance with the present invention.

FIG. 3A illustrates an exemplary method 300 of enabling publishing and subscription of data in accordance with the present invention. Assume (1) a user has already created an account in the cloud, (2) a primary device is already associated with the account, and (3) the user has requested that a secondary device be associated with the account. In some embodiments, the user's account is configured to perform the method 300. The method 300 begins at a step 305, where a unique pin for a secondary device is generated. The pin associates the user's account in the cloud with the secondary device.

At a step 310, the pin is shown to the user. In some embodiments, the pin is displayed on the primary device.

At a step 315, the secondary device is paired with the account in the cloud upon correctly providing the pin from the secondary device to the cloud. Although pairing via a pin is discussed in this example, other pairing techniques are contemplated including, but are not limited to, use of other shared secrets and use of public key cryptography, such as a certificate exchange.

At a step 320, publishing and subscription relationships between the primary device and the secondary device are managed. Typically, the user's account intelligently manages these relationships. In some embodiments, managing the relationship includes synching data between the primary device and the secondary device. In some embodiments, managing the relationship includes determining whether the primary device has proper dependancies for subscribing data published by the secondary device and, based on the determination, automatically satisfying the proper dependencies. Satisfying proper dependencies for synching is discussed elsewhere. After the step 320, the method 300 ends.

Figure 3B:
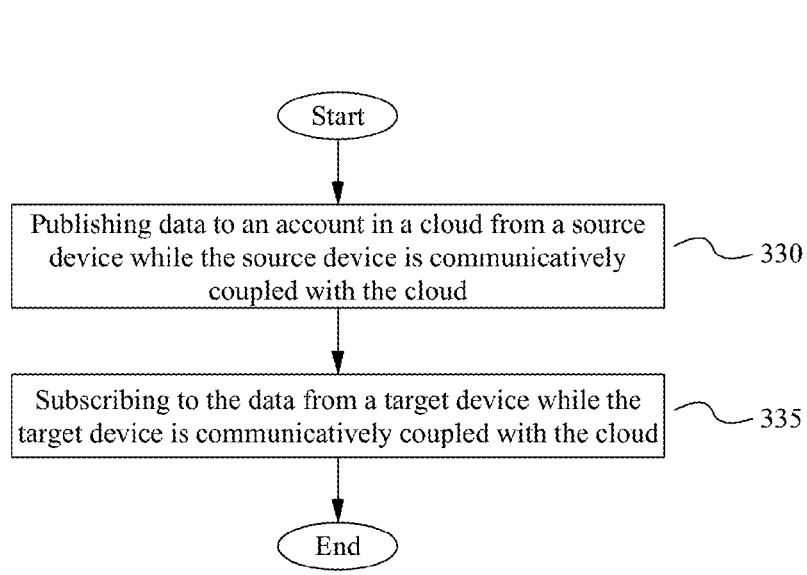
FIG. 3B illustrates an exemplary method of retrieving data from a cloud in accordance with the present invention.

FIG. 3B illustrates an exemplary method 325 of retrieving data from the cloud in accordance with the present invention. The method 325 begins at a step 330, where data is published to an account in the cloud from a source device while the source device is communicatively coupled with the cloud. Typically, the source device is associated with the account. In some embodiments, the data to be published to the cloud is determined by the user. Alternatively, the data to be published is automatically determined by the account, the source device, or both. After the data is published, the source device no longer needs to be but can remain communicatively coupled with the cloud. In some embodiments, the user is able to select one or more target devices to receive the data. In some embodiments, the account is configured to resolve conflicts during the transfer of the data from the source device to the cloud.

At a step 335, the data is subscribed to a target device while the target device is communicatively coupled with the cloud. Typically, the target device is associated with the account. In some embodiments, the source device and the target device support the same operating system. Alternatively, the source device and the target device do not support the same operating system. In some embodiments, the data is automatically retrieved and downloaded onto the target device upon coupling with the cloud. Alternatively or in addition to, user intervention is required to start, stop, and/or continue the transfer from the cloud to the target device. In some embodiments, the user is able to indicate which data to subscribe to. After the data is subscribed, the target device no longer needs to be but can remain communicatively coupled with the cloud. In some embodiments, the account is configured to resolve conflicts during the transfer of the data from the cloud to the target device. After the step 335, the method 325 ends.

Figure 4:
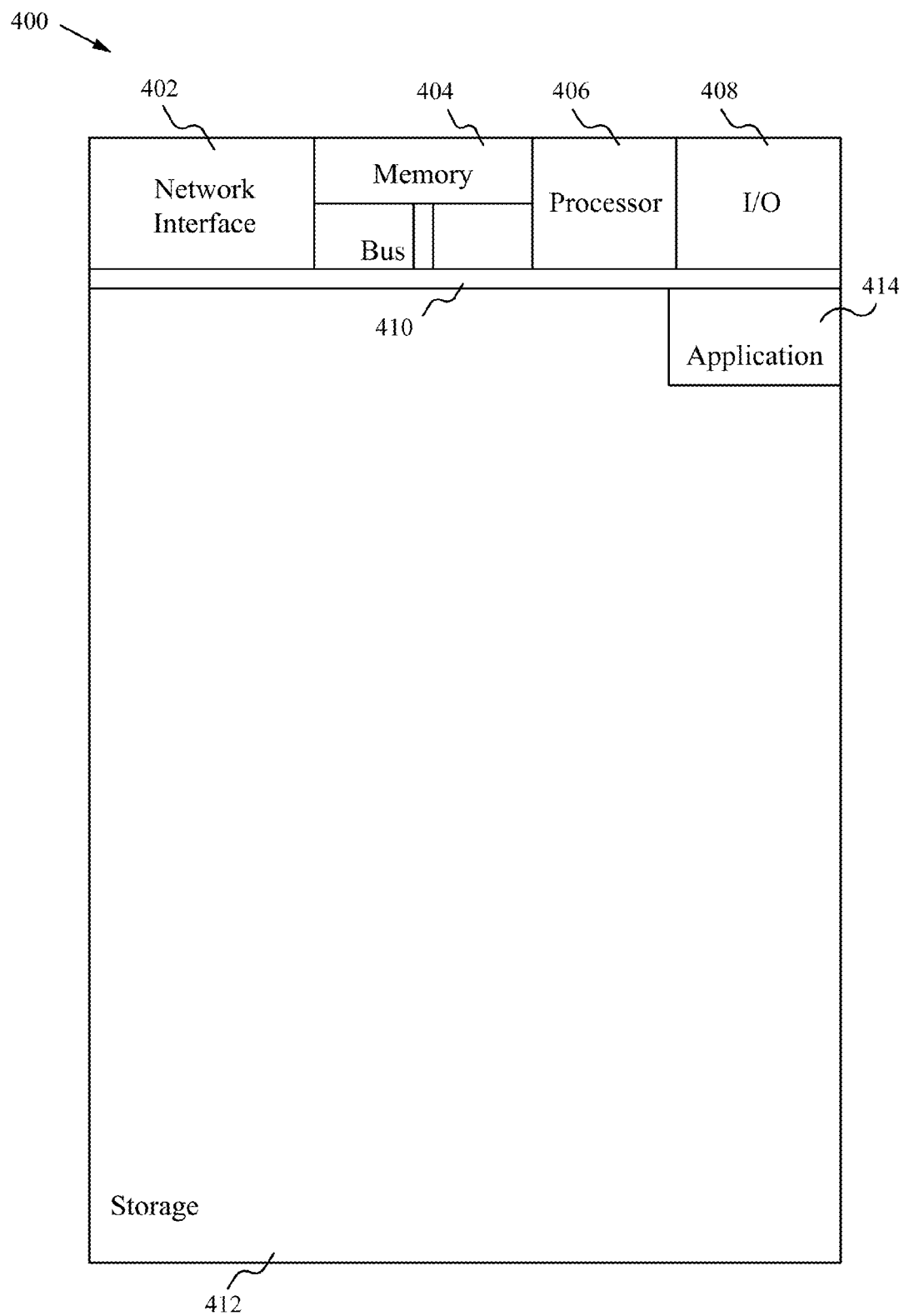
FIG. 4 illustrates a block diagram of an exemplary computing device in accordance with the present invention.

FIG. 4 illustrates a block diagram of an exemplary computing device 400 in accordance with the present invention. The computing device 400 is able to be used to acquire, cache, store, compute, search, transfer, communicate and/or display information. For example, the computing device 400 is able to communicatively couple with a cloud, such as the cloud 220, to synch with one or more other devices.

In general, a hardware structure suitable for implementing the computing device 400 includes a network interface 402, a memory 404, processor(s) 406, I/O device(s) 408, a bus 410 and a storage device 412. The choice of processor 406 is not critical as long as a suitable processor with sufficient speed is chosen. In some embodiments, the computing device 400 includes a plurality of processors 406. The memory 404 is able to be any conventional computer memory known in the art. The storage device 412 is able to include a hard drive, CDROM, CDRW, DVD, DVDRW, flash memory card, RAM, ROM, EPROM, EEPROM or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, display, printer, modem, touchscreen, button interface and other devices. Application(s) 414 are likely to be stored in the storage device 412 and memory 404 and are processed by the processor 406. More or less components shown in FIG. 4 are able to be included in the computing device 400.

The computing device 400 can be a tablet, a mobile phone, a smart phone, a desktop computer, a laptop computer, a netbook, or any suitable computing device such as special purpose devices, including set top boxes and automobile consoles.

The following exemplary scenarios will help demonstrate cloud-based synchronization in accordance with the present invention. Although any number of devices can be synchronized, the first scenario and the second scenario illustrate synching, for the sake of simplicity, between two devices. In particular, the first scenario illustrates synching applications from a mobile device to a computer, and the second scenario illustrates synching applications from the computer to the mobile device. Assume in these scenarios that the user has already created an account in the cloud and has associated the two devices (e.g., mobile device and computer) with the account in the cloud.

CBDS Exemplary Scenario 1: Synching Data from a Mobile Device to a Computer

Figure 5A:
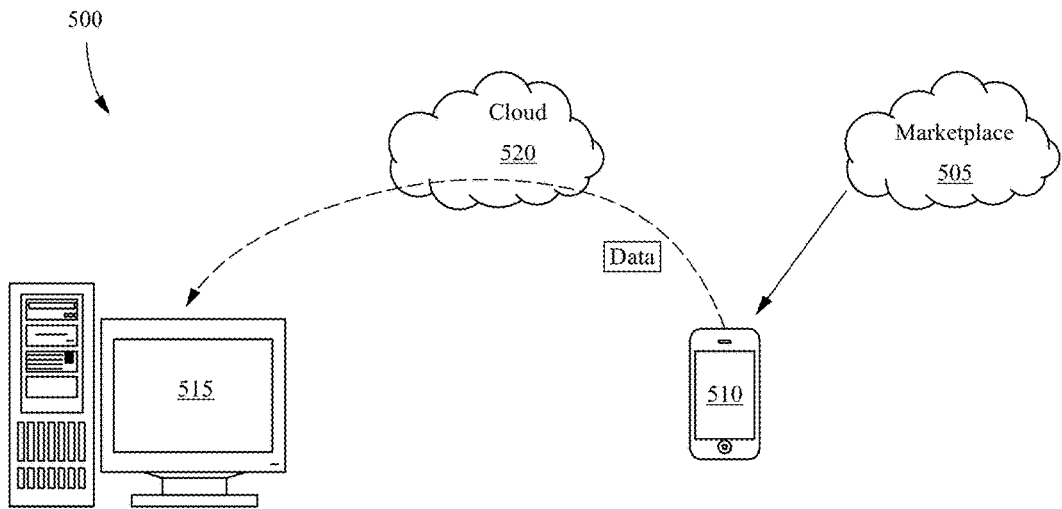
FIG. 5A illustrates an exemplary system for synching data between two devices in accordance with the present invention.

FIG. 5A illustrates an exemplary system 500 for synching data between two devices in accordance with the present invention. The system 500 includes a marketplace 505, a plurality of devices 510, 515, and BlueStacks™ cloud service hosted in a cloud 520. In this example, the plurality of devices includes a mobile device 510 configured as a source device and a computer 515 configured as a target device. Although more devices can be included in the system 500, only the source device 510 and the target device 515 are illustrated for the sake of clarity. In some embodiments, the marketplace 505 is similarly configured as the marketplace 205. The user is able to utilize the marketplace 505 to retrieve applications therefrom onto the source device 510. In some embodiments, the cloud 520 is similarly configured as the cloud 220. The user is able to utilize the cloud service to synch data (e.g., applications) from the mobile device 510 to the computer 515 via the cloud 520.

Figure 5B:
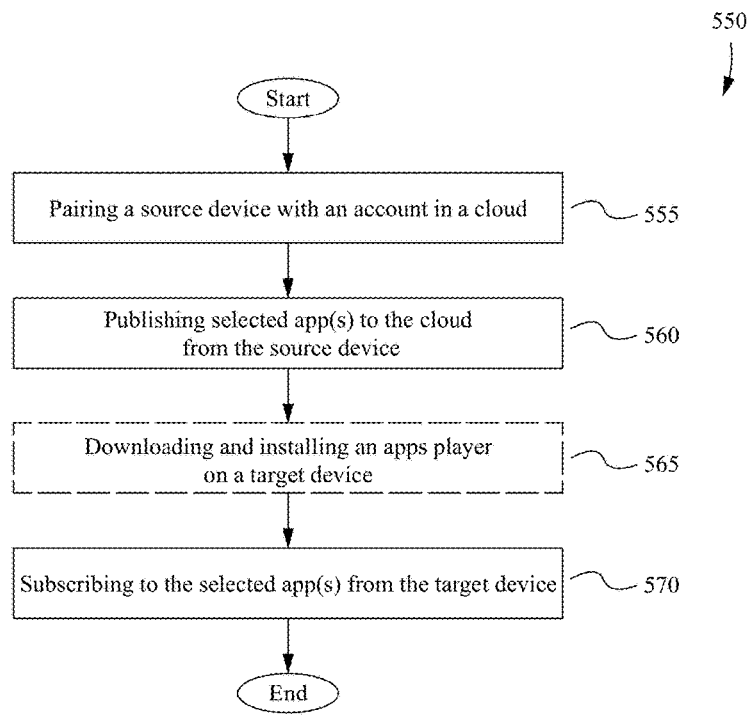
FIG. 5B illustrates an exemplary method for synching applications between two devices of FIG. 5A in accordance with the present invention.
Figure 5C:
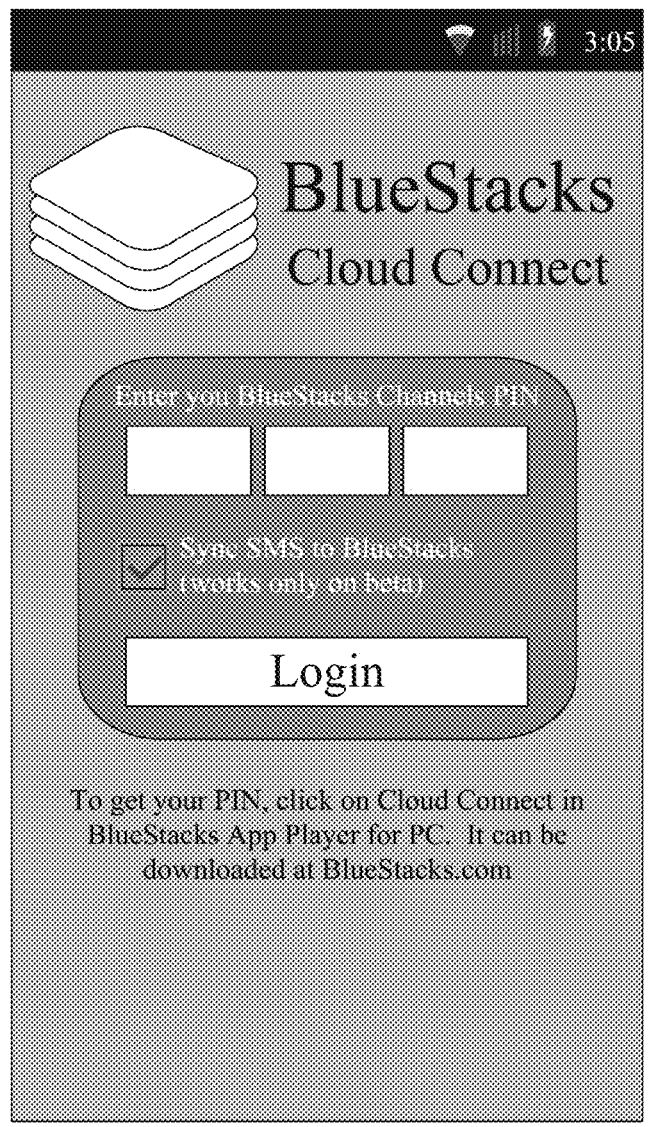
FIGS. 5C-5E illustrate exemplary GUIs of FIG. 5B in accordance with the present invention.

FIG. 5B illustrates an exemplary method 550 for synching applications between the two devices of FIG. 5A in accordance with the present invention. The method 550 begins at a step 555, where the source device (e.g., the mobile device 510 of FIG. 5A) is paired with the account in the cloud. In some embodiments, the source device is paired with the cloud by entering a proper pin in a companion application running on the source device. FIG. 5C illustrates an exemplary GUI interface of the companion application, which allows the user to enter a pin for pairing. Typically, the pin is a unique pin previously generated for the user by the cloud service. Other authentication procedures are contemplated.

Figure 5D:
Figure 5E:
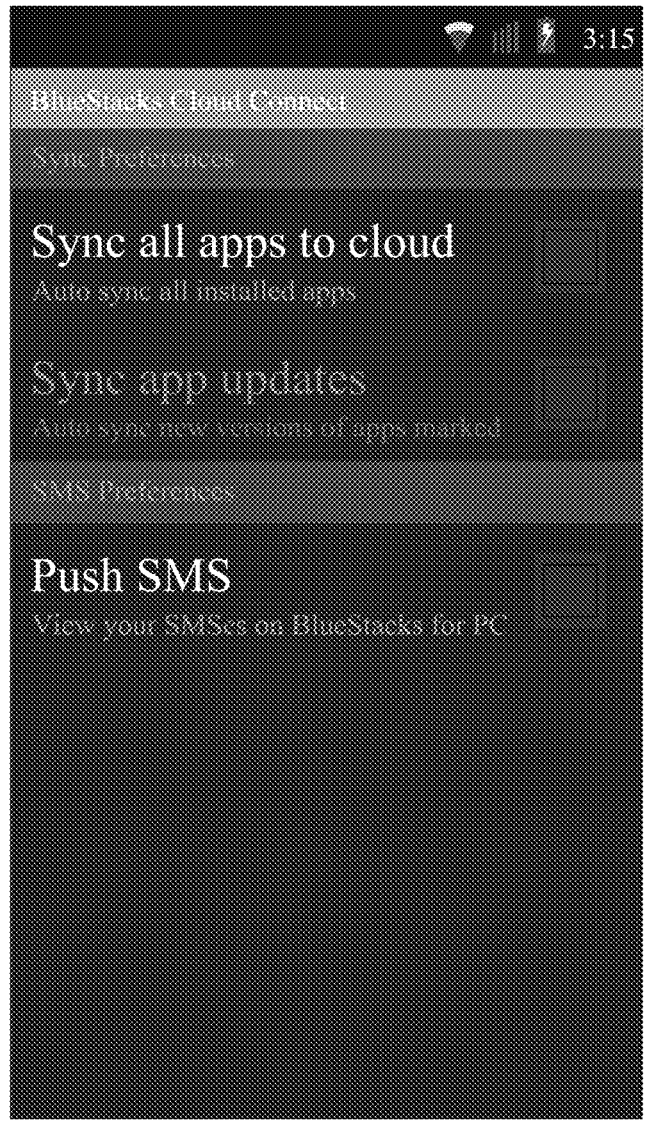

After the source device is paired with the cloud, at a step 560, selected application(s) are published to the cloud from the source device. In some embodiments, the user is able to pick and choose from an applications listing the application(s) to publish to the cloud, as illustrated in FIG. 5D. Alternatively or in addition to, the user is able to concurrently publish all applications to the cloud, as illustrated in FIGS. 5D-5E, by clicking on the appropriate boxes in the companion application. In some embodiments, the user is able to configure which of the devices associated with the account is/are the target device(s) for subscribing to the published application(s). The source device typically remains communicatively coupled with the account during publishing but can become communicatively decoupled after publishing.

In some embodiments, the user is able to configure the companion application on the source device to auto synch all applications, as illustrated in FIG. 5E, upon communicatively coupling with the account. Different techniques can be implemented to perform auto synchronization. One technique is polling. With the polling approach, the companion application periodically checks to see if any new applications or updates are installed on the source device. If there are, those applications and/or updates are published to the cloud. Another technique is hooking into a notification feature provided by the source device. With the hooking approach, the companion application receives notifications from the notification feature. The notification feature typically notifies when a new application or an update has been installed on the source device. If the companion application receives a notification, then the new application and/or update are published to the cloud. Regardless of the technique used, auto synchronization is performed in the background, typically without or with minimal user intervention.

The account in the cloud is typically intelligent; it is able to determine whether a target device, once it is communicatively coupled with the account, has proper dependencies. In other words, the account is configured to determine whether the target device is able to subscribe to the data (e.g., applications) published by the source device. Simply put, the account is configured to determine whether the target device is able to run all the applications published by the source device. In some embodiments, if the target device is not able to run an application, then the target device is not permitted to subscribe to that applications until the proper dependencies are satisfied. In some embodiments, proper dependencies can be satisfied by downloading and installing the BlueStacks™ application player.

At an optional step 565, an application player is downloaded and installed on the target device (e.g., the computer 515 of FIG. 5A) to satisfy the proper dependencies. In some embodiments, the account automatically pushes a software program for the application player onto the target device for installation. Typically, the application player supports the same operating system as that supported by the source device. In some embodiments, even if the account determines that the target device does not have the proper dependencies, the target device is able to subscribe to those applications.

At a step 570, the target device, once communicatively coupled with the cloud, subscribes to the selected application(s) from the cloud. In some embodiments, the target device subscribes to these applications even if the target device cannot natively run these applications. In some embodiments, the account is configured to determine where on the target device to download the selected applications. For example, the applications are downloaded to a specific folder on the target device. For another example, if the source device's operating system is different from the target device's host operating system but is the same as the target device's guest operating system, then the selected applications are automatically stored in the guest environment. In other words, the applications are downloaded in the appropriate operating system supported by the target device for execution. The subscription can be user initiated and/or automatic. In some embodiments, the user is able to select to which applications to subscribe, including those that were published at previous times and/or by other devices associated with the account. Alternatively or in addition, the target device automatically subscribes to any new or updated applications upon coupling with the cloud. The target device typically remains communicatively coupled with the account during subscription but can optionally become communicatively decoupled after subscription. After the step 570, the method 550 ends.

Figure 6A:
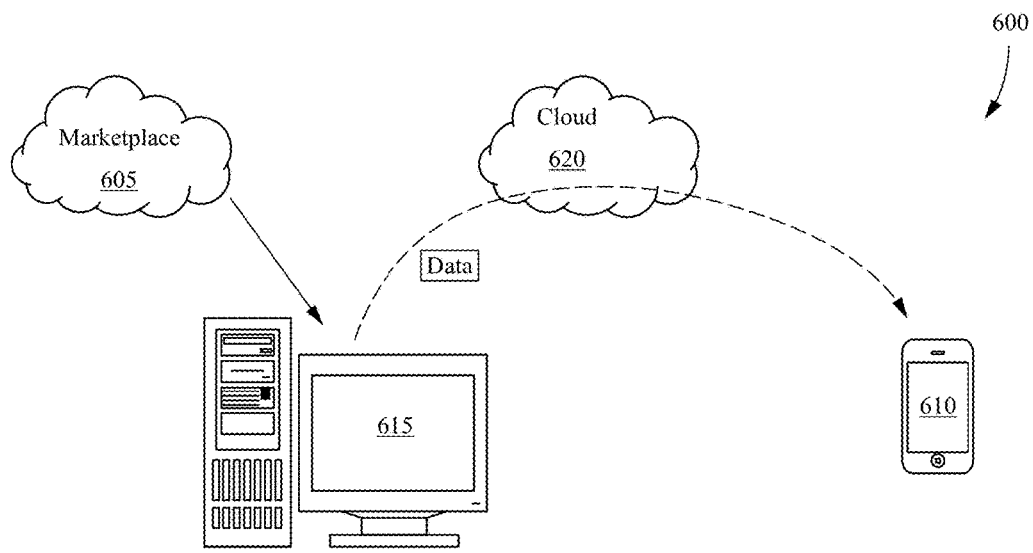
FIG. 6A illustrates another exemplary system for synching data between two devices in accordance with the present invention.

CBDS Exemplary Scenario 2: Synching Data from a Computer to a Mobile Device FIG. 6A illustrates another exemplary system 600 for synching data between two devices in accordance with the present invention. The system 600 includes a marketplace 605, a plurality of devices 610, 615, and BlueStacks™ cloud service hosted in a cloud 620. In this example, the plurality of devices includes a mobile device 610 configured as a target device and a computer 615 configured as a source device. Although more devices can be included in the system 600, only the source device 615 and the target device 610 are illustrated for the sake of clarity. In some embodiments, the marketplace 605 is similarly configured as the marketplace 205. The user is able to utilize the marketplace 605 to retrieve applications therefrom. In some embodiments, the user is able to download and install the BlueStacks™ application player, which can be configured as an application broker, on the computer 615. The user is able to search for an application by using the application broker, which is configured as a single interface that accesses one or more marketplaces 605. In some embodiments, the cloud 620 is similarly configured as the cloud 220. The user is able to utilize the cloud service to synch data (e.g., applications) from the computer 615 to the mobile device 610 via the cloud 620.

Figure 6B:
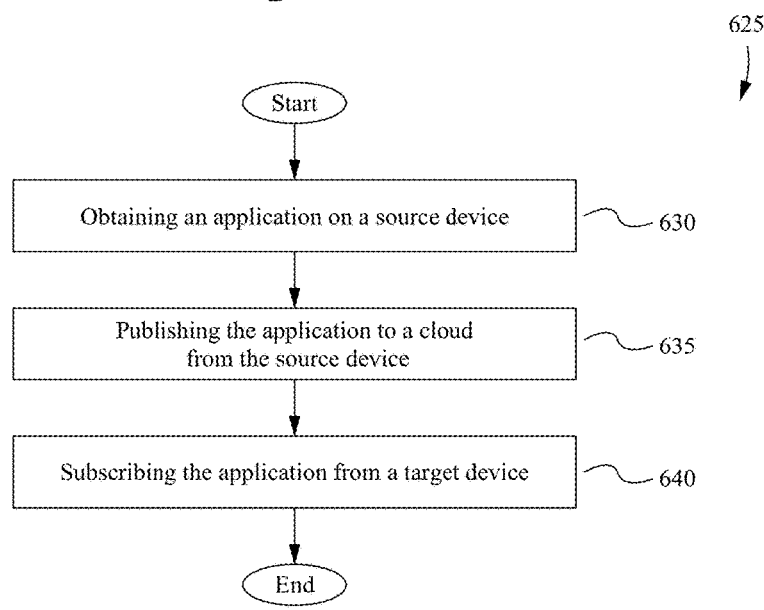
FIG. 6B illustrates an exemplary method for synching applications between two devices of FIG. 6A in accordance with the present invention.

FIG. 6B illustrates an exemplary method 625 for synching applications between the two devices of FIG. 6A in accordance with the present invention. The method 625 begins at a step 630, where the source device (e.g., the computer 615 of FIG. 6A) obtains an application. In some embodiments, the source device obtains the application using the BlueStacks™ application player when configured as an application broker to search for a particular application from one or more marketplaces. The BlueStacks™ application player is typically auto-configured to communicatively couple with the cloud.

At a step 635, the application is published to the cloud from the source device. In some embodiments, the application is published to the cloud via the BlueStacks™ application player. In some embodiments, the user is able to pick and choose from an applications listing the application(s) to publish to the cloud. The applications listing can display applications for only one of the operating systems supported by the source device. The application listing can also display applications for some or all of the operating systems supported by the source device. Alternatively or in addition to, the user is able to concurrently publish all applications to the cloud. In some embodiments, the user is able to configure which of the devices associated with the account is/are the target device(s) for subscribing to the published application(s). The source device typically remains communicatively coupled with the account during publishing but can become communicatively decoupled after publishing.

At a step 640, the target device, once communicatively coupled with the cloud, subscribes to the published application from the cloud. The subscription can be user initiated and/or automatic. In some embodiments, the user is able to selectively subscribe to certain applications, including those that were published at previous times and/or by other devices associated with the account. Alternatively or in addition to, the target device automatically subscribes to any new or updated applications upon communicatively coupling with the cloud. The target device typically remains communicatively coupled with the account during subscription but can selectively become communicatively decoupled after subscription. After the step 640, the method 625 ends.

In some instances, the user may want to comparison shop for applications on a computer (e.g., source device), because the computer provides a full screen experience and/or the navigation on the computer is easier. Comparison shopping on such a source device allows the user to simultaneously run multiple applications, review details for applications and/or read user application reviews, prior to installing an application on a chosen target device (e.g., mobile device), which may have a more limited screen size as compared to that of the source device.

Figure 6C:
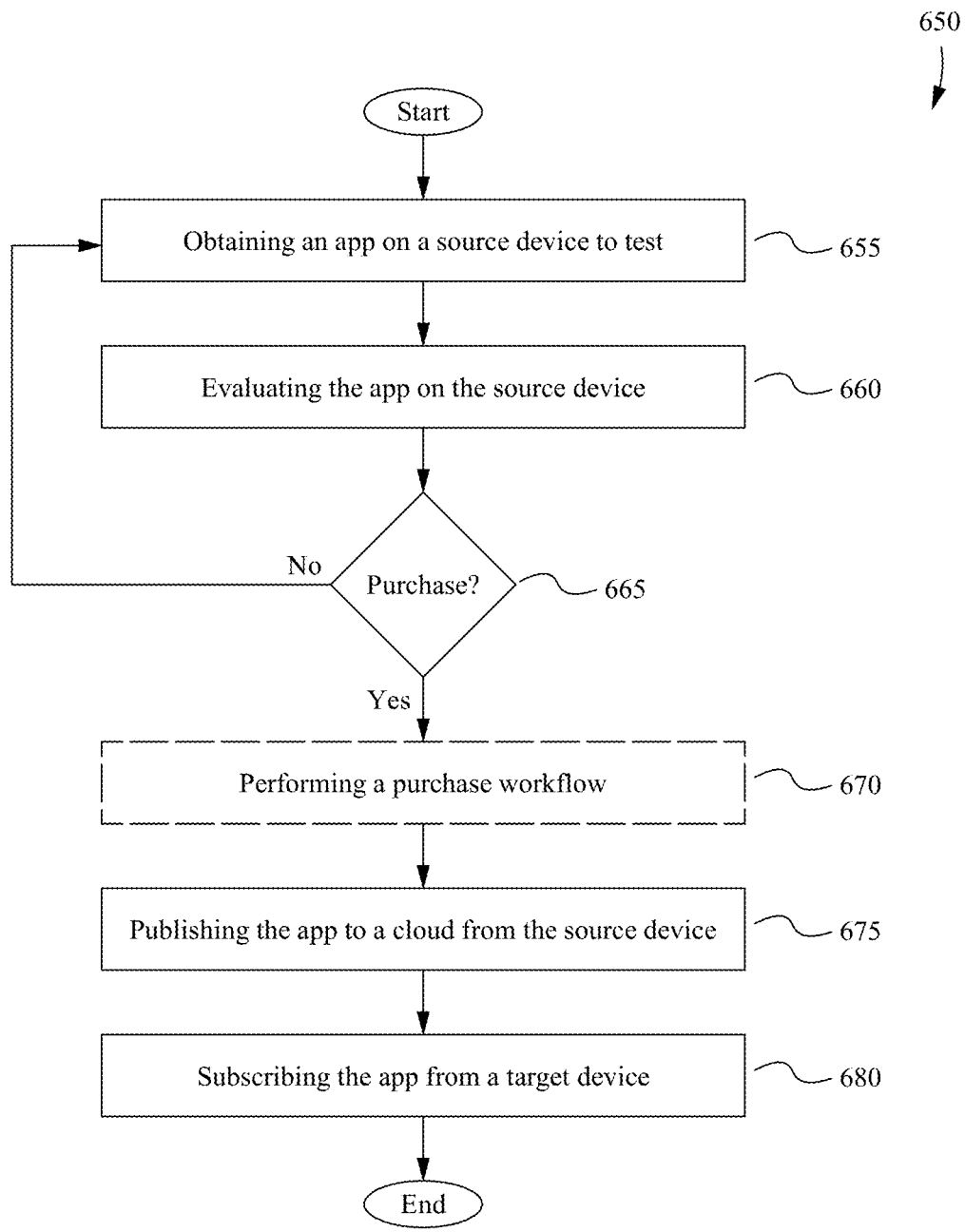
FIG. 6C illustrates an exemplary method of test driving an application in accordance with the present invention.

FIG. 6C illustrates an exemplary method 650 of test driving an application in accordance with the present invention. The method 650 starts with a step 655, where the source device (e.g., the computer 615 of FIG. 6A) obtains an application to test. The step 655 is similar to the step 630.

At a step 660, the application is evaluated on the source device. In some embodiments, in order to test the application on the source device, a suitable virtualization environment is required. The virtualization environment can be provided through the BlueStacks™ application player or by other third party developers. The virtualization environment allows the user to test an otherwise incompatible application on the source device. For example, the user with a Windows PC would require a virtualization environment in order to test Android applications.

At a step 565, a decision is made as to whether the application is to be purchased. If it is determined that the application is not to be purchased, then the method 650 returns to the step 655. If it is determined that the application is to be purchased, then at an optional step 670, a purchase workflow is performed, allowing the user to obtain the application.

At a step 675, the application is published to the cloud from the source device. The step 675 is similar to the step 635.

At a step 680, the target device, once communicatively coupled with the cloud, subscribes to the published application. The step 680 is similar to the step 640. After the step 680, the method 650 ends.

It should be noted that although the examples previously discussed above include a marketplace, the present invention is able to function with other mechanisms of placing applications/data on a source device, such as company managed devices, which have their own software distribution mechanisms. For another example, a user is able to manually download and install software from the Internet.

CBDS Advantages

Embodiments of the present invention allow data to be automatically and transparently synched among two or more devices. The synchronization is effected through a cloud service. The user experience is advantageously seamless. In some embodiments, the cloud service is able to intelligently determine compatibility of data for a target device. For example, the cloud service is able to determine whether the target device is able to execute a published application, and to prevent the target device from subscribing to the published application until proper dependencies are fulfilled on the target device.

Embodiments of the present invention advantageously allow a user to shop for applications on a source device prior to installing the application on a target device, perhaps because the source device provides a better ability to make purchasing decisions.

Embodiments of the present invention advantageously allow a user to store data with the cloud service, for example, when the user needs additional storage space on the source device or, for another example, the user needs to reinstall/reconfigure the source device by temporarily removing the data from the source device but without permanently losing such data.

Embodiments of the present invention advantageously allow a user to access SMS messages on a work computer (e.g., target device) via the cloud that were sent to a mobile device (e.g., source device). This is particularly useful when the user, for example, had forgotten the mobile device at home.

Embodiments of the present invention advantageously allow the user to decide that the user no longer wants to play a game on a computer (e.g., source device) but rather on a mobile device (e.g., target device) so that the user is able to play the game on the bus to and from work.

Non-Native Notifications Overview

In some embodiments, a target device can also be configured to inform a user regarding notifications generated by non-native applications. A non-native application can be a guest operating system specific application executing within a guest environment by using, such as, the BlueStacks™ application player or the like on the target device. Alternatively, a non-native application can be an application executing on a physically disjoint source device that is communicatively coupled with the target device via a local pairing mechanism or the BlueStacks™ cloud service hosted in the cloud. The target device and the source device can be similar (e.g., a PC and a PC) or different (e.g., a PC and a MAC, or a PC and a smart phone).

Both the BlueStacks™ application player and the source device are typically configured to capture notifications generated by applications executing thereon, and the target device is configured to receive and present these non-native notifications to the user. Notifications include alerts, reminders, updates and messages generated by applications. The user does not need to access non-native applications, or the BlueStacks™ application player or the source device to see these non-native notifications. Instead, the user can view these non-native notifications at a central location on the target device. It should be noted that non-native notifications, or simply notifications, refer to notifications generated by applications that are not natively executing within the host environment of the target device.

A target device typically has a message center installed thereon. The message center is configured to extract, pull or otherwise receive non-native notifications from various sources, such as from physically disjoint source devices and from the BlueStacks™ application player, to be displayed at a central location on the target device, either with the original or modified content and/or format. In some embodiments, the central location on the target device is typically in a pane that appears in the foreground such that the user is able to see the non-native notifications even while running other applications. The message center can be integral with or separate from the BlueStacks™ application player. As such, by installing the BlueStacks™ application player on the target device, the user will automatically have access to the message center. In some embodiments, the pane automatically closes after a predetermined amount of time. Alternatively, the pane closes after user interaction, such as closing the pane.

A source device typically has a notification tool installed thereon. The notification tool is configured to access notifications generated by applications executing on the source device and is also configured to communicate with a message center. In some embodiments, the notification tool is able to push or otherwise send these notifications to the message center. In some embodiments, the notification tool is also able to receive data from the message center for further processing. The notification tool can be a standalone feature or can be included as part of the companion application discussed above. As such, by installing the companion application on the source device, the user can automatically have access to the notification tool.

The BlueStacks™ application player typically has a notification tool built therein that is configured to access notifications generated by applications executing within the BlueStacks™ application player and is also configured to communicate with a message center. In some embodiments, the message center is integral with the BlueStacks™ application player. The notification tool is able to push or otherwise send these notifications to the message center. In some embodiments, the notification tool is also able to receive data from the message center for further processing.

Receiving Notifications on a Target Device

Figure 7A:
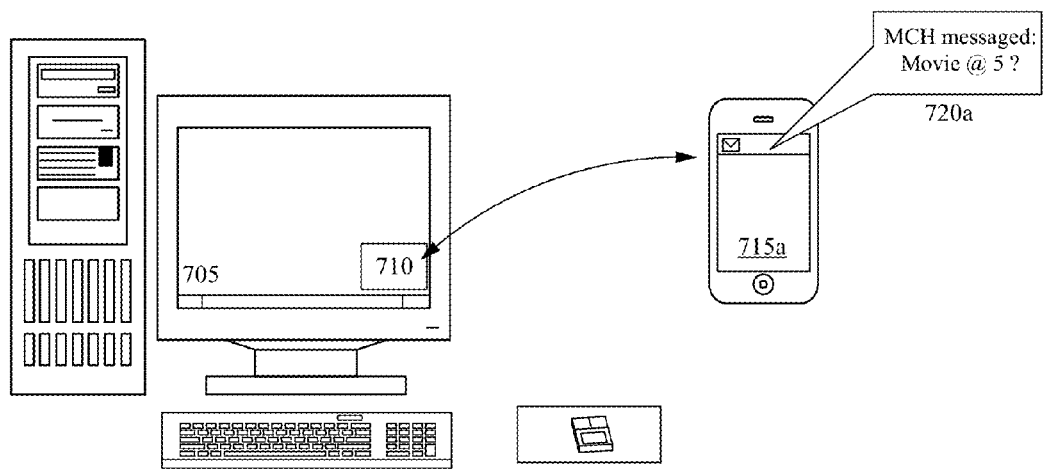
FIG. 7A-7C illustrate exemplary notification scenarios in accordance with the present invention.
Figure 7B:
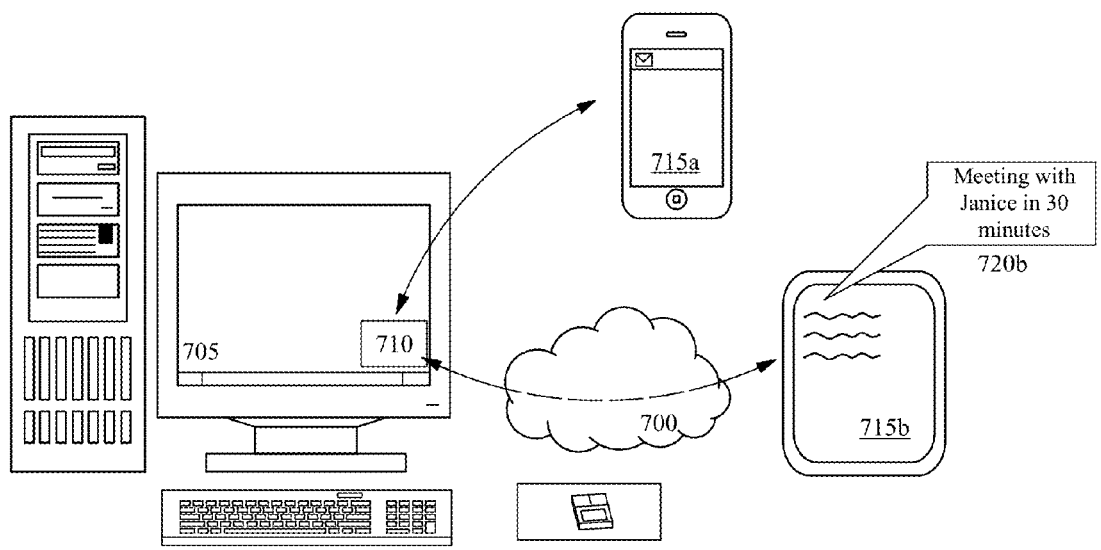
Figure 7C:
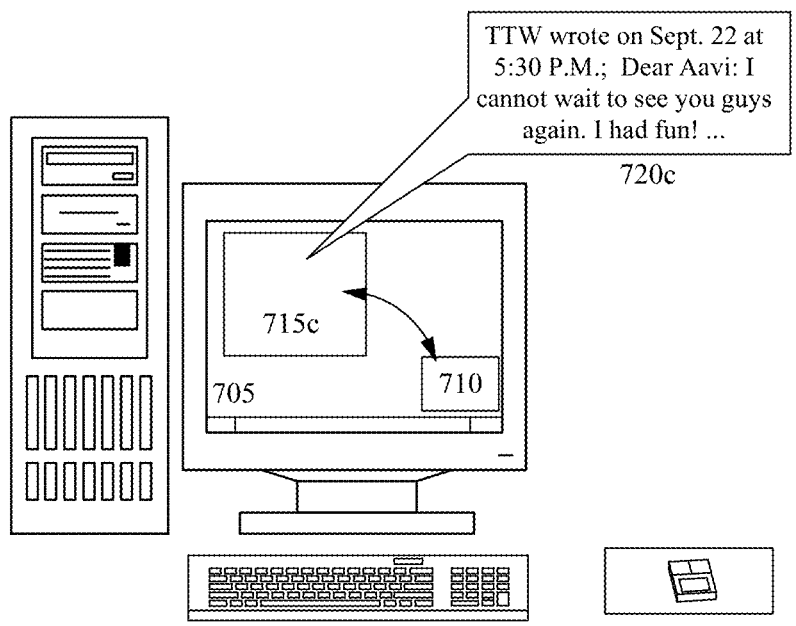

FIGS. 7A-7C illustrate exemplary notification scenarios in accordance with the present invention and are not intended to limit the present invention in any way. In each scenario set forth below, the target device is a computer. Although the source devices and the target device illustrated are shown as different devices, they can be all the same.

FIG. 7A illustrates a target device 705 communicatively coupled with a single source device 715*a*. As shown, the target device 705 is a computer and the source device 715*a* is a smart phone. The computer 705 and the smart phone 715*a* are locally paired using a pairing mechanism, such as Bluetooth or WiFi. Assume a text messaging application is active on the smart phone 715*a*. When a text message arrives at the smart phone 715*a*, a text notification 720*a* is typically shown on the smart phone 715*a* to indicate that a new text message has just been received. The text notification 720*a* shows at least part of the text message. The text notification 720*a* illustrated in FIG. 7A reads "MCH messaged: Movie @ 5?" The notification tool on the smart phone 715*a* is configured to capture the text notification 720*a*, and the message center on the computer 705 is configured to receive the text notification 720*a* from the notification tool via the pairing mechanism. The message center on the computer 705 is configured to thereafter display the same or a variation of the text notification 720*a* in a pane 710. In some embodiments, the message center will also display identification information of the smart phone 715*a* along with the notification to let the user know where the notification came from.

Although the target device 705 shown in FIG. 7A is communicatively coupled with a single source device, the target device 705 can be communicatively coupled with a plurality of source device. FIG. 7B illustrates the target device 705 communicatively coupled with two source devices 715*a*, 715*b*. As shown, the computer 705 is communicatively coupled with the smart phone 715*a* and a tablet 715*b*. The computer 705 is able to couple with the two source devices 715*a*, 715*b* using the same or different coupling mechanism. In FIG. 7B, the computer 705 is communicatively coupled with the smart phone 715*a* via a local pairing mechanism, while the computer 705 is communicatively coupled with the tablet 715*b* via the BlueStacks™ cloud service hosted in a cloud 700. As previously discussed above, the BlueStacks™ cloud service allows publication and subscription of data by devices from the cloud 700. In some embodiments, the tablet 715*b* uses the companion application thereon to connect with the cloud 700.

Assume a calendar application is active on the tablet 715*b*. Prior to the actual occurrence of an event, a calendar notification 720*b* is typically shown on the tablet 715*b* to indicate that the event will be soon occurring. The calendar notification 720*b* illustrated in FIG. 7B reads "Meeting with Janice in 30 minutes."

Similar to the smart phone 715*a*, the tablet 715*b* utilizes a notification tool to capture all notifications generated by any active application, such as the calendar application, executing on the tablet 715*b*. However, the notification tool is typically integral with the companion application installed on the tablet 715b, although the notification tool can be separate from but interacts with the companion application. The notification tool on the tablet 715b is configured to capture the calendar notification 720b. The companion application publishes the calendar notification 720b to the cloud 700. The message center on the computer 705 is configured to subscribe to the calendar notification 720b. The message center on the computer 705 is configured to thereafter display the same or a variation of the calendar notification 720b in the pane 710. In some embodiments, the message center will also display identification information of the tablet 715b along with the notification to let the user know where the notification came from.

The notification tool of the present invention is able to capture all notifications, such as alerts, reminders, updates and messages, generated by any active application executing a source device, such as the smart phone 715a or the tablet 715b. In addition to the text messaging application and the calendar application as discussed above, other exemplary applications include a news feed application (e.g., mobile Pulse application), a social media application (e.g., mobile Facebook application), an alarm application, a voicemail application, and an email application. Other applications are contemplated. The notification tool of the present invention is able to assist in the delivery of these notifications to a message center on a target device, such as the computer 705.

The coupling between a target device and a source device can be either through local pairing or the cloud. In some embodiments, the cloud can also assist a user in the pairing of two or more devices. However, regardless of the coupling mechanisms used and regardless of the number of source devices the target device is coupled with, the user is able to receive all notifications across the diverse group of communicatively coupled source devices at a central location on the target device.

Similarly, the user is also able to receive all notifications from the BlueStacks™ application player at the central location on the target device. FIG. 7C illustrates the target device 705 running the BlueStacks™ application player 715c, which allows the computer 705 to support a multi-OS runtime. In some embodiments, a notification tool and a message center are integral with the BlueStacks™ application player 715c. Alternatively, the notification tool and/or the message center are separate from but interact with the BlueStacks™ application player 715c.

Assume an email application is active in the BlueStacks™ application player 715c. When an email message arrives, a email notification 720c is typically shown within the BlueStacks™ application player 715c to indicate that a new email message has just been received. The email notification 720c shows at least part of the email message. The email notification 720c illustrated in FIG. 7C reads "TTW wrote on Septtember 22 at 5:30 PM; Dear Avi: I cannot wait to see you guys again. I had fun!" The notification tool of the BlueStacks™ application player 715c is configured to capture the email notification 720c, and the message center is configured to receive the email notification 720c from the notification tool. The message center on the computer 705 is configured to thereafter display the same or a variation of the email notification 720c in the pane 710. In some embodiments, the message center will also display identification information of where the email notification 720c came from along with the notification to let the user know where the notification came from.

FIG. 7C illustrates the computer 705 in communication only with the BlueStacks™ application player 715c. However, it should be noted that the computer 705 can concurrently be in communication with one or more source devices, such as illustrated in FIGS. 7A-7B.

Figure 8:
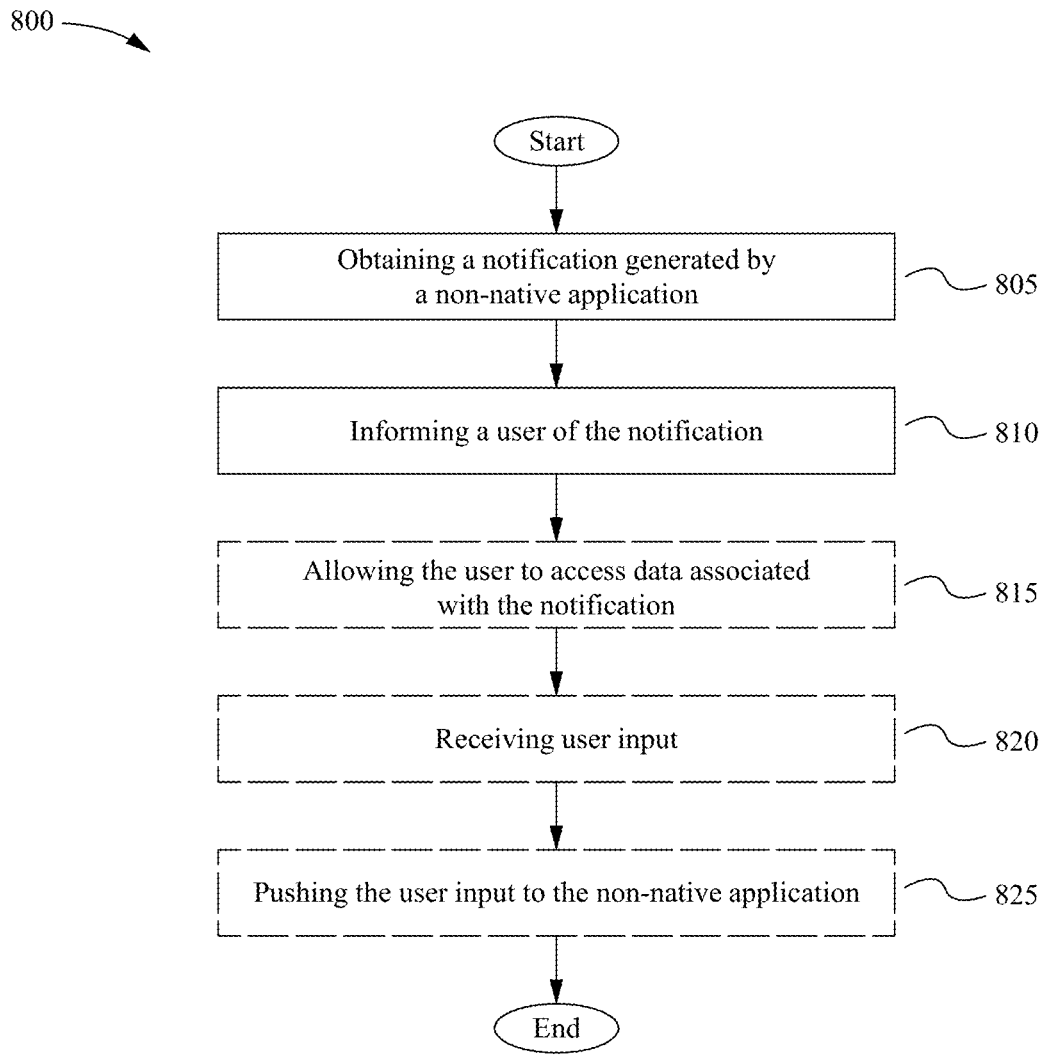
FIG. 8 illustrates an exemplary method of a message center on a target device in accordance with the present invention.

FIG. 8 illustrates an exemplary method 800 of a message center on a target device in accordance with the present invention. The method 800 begins at a step 805, where the message center receives or otherwise obtains a notification from a notification tool. The notification is generated by a non-native application. For example, the non-native application is executed on a physically disjoint source device communicatively coupled with the target device. For another example, the non-native application is executed within the BlueStacks™ application player on the target device.

At a step 810, the message center informs the user of the notification. In some embodiment, the message center generates a pane in the foreground of the user's workspace. The pane displays, at least, the original or modified content and/or format of the notification.

At an optional step 815, the message center allows the user to access data associated with the notification. In some embodiments, when the user activates the pane, the pane expands to display the entire text message (e.g., "MCH Messaged: Movie @ 5? Then dinner afterwards? Let me know.") associated with the notification. In some embodiments, if the associated non-native application is running in the BlueStacks™ application player, the BlueStacks™ application player will be brought from the background to the foreground when the user activates the pane. In some embodiments, if the notification is regarding a new voicemail message, the user is able to listen to the voicemail on the target device when the user activates the pane.

At an optional step 820, the message center is able to receive a user input in response to the notification. For example, the user is able to draft a reply text message in a field provided by the message center.

At an optional step 825, the message center pushes or otherwise delivers the user input to a notification tool for further processing. For example, the message center is able to take the reply text message (e.g., the user input) and push the user input to the notification tool for further processing (e.g., appropriately packaging the user input such that it can be understood by the messaging application on the smart phone and to be sent to the recipient MCH therefrom. Alternatively, the message center is configured to perform the packaging instead. After the step 825, the method 800 ends.

Target Device Notification Advantages

Embodiments of the present invention advantageously allow a user to view all notifications generated by any application on any communicatively coupled source device at a single location on a target device. The user does not need to retrieve the source device to see the notification. This is particularly useful when the user only has the target device in his possession such as in a meeting or has simply forgotten the source device at home. Provided that the source device and the target device are communicatively coupled, the target device is able to indicate to the user all notifications generated from the source device.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A system comprising:
   an account in a cloud;
   a computing device implemented first operating system including a notification tool that is configured to run in the first operating system and to capture notifications generated by a plurality of applications executing in the first operating system; and
   a target computing device comprising at least one processor, a memory, and a second operating system, the second operating system including a message center that is configured to run in the second operating system and that is communicatively coupled with the notification tool running in the first operating system through the account in the cloud, wherein the message center running in the second operating system is configured to obtain through the account in the cloud, a notification that is generated by one of the plurality of applications executing in the first operating system and that is captured by the notification tool running in the first operating system, and the message center is configured to present the obtained notification to a user in the foreground of a workspace on the target device.

2. The system of claim 1, wherein the application executing in the first operating system is a text message application, a news feed application, a networking application, an email application, a calendar application, a game application, a tool application, a marketing application, or an alarm application.

3. The system of claim 1, wherein the obtained notification is presented to the user in a central location of a display.

4. The system of claim 1, wherein the message center running in the second operating system is also configured to receive a user input, in response to the notification, in the message center, and to push the user input to the application that generated the notification in the first operating system.

5. The system of claim 4, wherein the notification tool running in the first operating system is configured to package the user input such that the application that generated the notification in the first operating system understands the user input that is received by the message center running in the second operating system.

6. The system of claim 1, wherein the second operating system is a host operating system of the target computing device and the first operating system is a guest operating system of the same computing device.

7. The system of claim 1, wherein the first operating system is on a source device that is distinct and separate from the target computing device.

8. The system of claim 7, wherein the target computing device and the source device are communicatively coupled via the account in the cloud.

9. The system of claim 7, wherein the source device and the target computing device are each configured to at least one of publish data to the cloud and subscribe data from the cloud.

10. The system of claim 1, further comprising a third operating system including a notification tool that is configured to run in the third operating system and to capture notifications generated by a plurality of applications executing in the third operating system.

11. The system of claim 10, wherein the message center running in the second operating system is communicatively coupled with the notification tool running in the third operating system, wherein the message center running in the second operating system is configured to obtain a notification that is captured by the notification tool running in the third operating system.

12. The system of claim 1, wherein the second operating system further comprising an application player that is configured to execute the applications executing in the first operating system.

13. The system of claim 12, wherein the message center is integral with the application player.

14. The system of claim 12, wherein the notification tool is integral with the application player.

15. The system of claim 12, wherein the application player includes an application broker that interfaces with a plurality of online application sources, wherein the application player is configured to:
   receive a search text via the application broker;
   search each of the online application sources;
   return a results list based on the search text, wherein the results list comprises one or more entries representing one or more applications from the application sources; and
   display a refined results list, wherein the refined results list is determined by excluding duplicate entries from the results list that represent applications from two or more of the application sources such that each of the one or more applications are represented only by a single entry.

16. A method comprising:
   running a notification tool in a computing device implemented first operating system, wherein the notification tool is communicatively coupled to an account in a cloud, and is configured to capture notifications generated by a plurality of applications executing in the first operating system; and
   running a message center in a second operating system of a target computing device, wherein the message center is communicatively coupled with the notification tool running in the first operating system through the account in the cloud, and the message center is configured to:
      obtain through the account in the cloud, a notification that is generated by one of the plurality of applications executing in the first operating system and that is captured by the notification tool running in the first operating system; and
      present the obtained notification to a user in the foreground of a workspace on the target computing device.

* * * * *

UNITED STATES PATENT AND TRADEMARK OFFICE
CERTIFICATE OF CORRECTION

PATENT NO.        : 10,255,080 B2
APPLICATION NO.   : 15/209069
DATED             : April 9, 2019
INVENTOR(S)       : Shashi Kant Sharma et al.

Page 1 of 1

It is certified that error appears in the above-identified patent and that said Letters Patent is hereby corrected as shown below:

On the Title Page

Item [72], Column 1, Line 3, delete "Haryana (JP);" and insert -- Haryana (IN); --

Signed and Sealed this
Eighteenth Day of June, 2019

Andrei Iancu
*Director of the United States Patent and Trademark Office*